(12) United States Patent
Vasseur

(10) Patent No.: US 6,169,137 B1
(45) Date of Patent: Jan. 2, 2001

(54) TIRE HAVING A BASE OF PRECIPITATED SILICA WITH IMPROVED ROLLING RESISTANCE

(75) Inventor: Didier Vasseur, Clermont-Ferrand (FR)

(73) Assignee: Compagnie Generale des Etablissements Michelin & Cie, Clermont-Ferrand Cedex (FR)

( * ) Notice: Under 35 U.S.C. 154(b), the term of this patent shall be extended for 0 days.

(21) Appl. No.: 09/111,608

(22) Filed: Jul. 7, 1998

Related U.S. Application Data

(62) Division of application No. 08/587,067, filed on Jan. 16, 1996, now Pat. No. 5,871,597.

(30) Foreign Application Priority Data

Jan. 20, 1995 (FR) .................................................. 95/00933

(51) Int. Cl.$^7$ .................................................... C08K 3/34
(52) U.S. Cl. ............................................................. 524/493
(58) Field of Search .............................. 524/493; 423/335

(56) References Cited

U.S. PATENT DOCUMENTS

| | | | |
|---|---|---|---|
| 2,897,869 | 8/1959 | Polmanteer | 524/493 |
| 3,208,823 | 9/1965 | Baker et al. | 524/483 |
| 3,411,970 | 11/1968 | Perrin | 152/565 |
| 3,514,357 | 5/1970 | Torti et al. | 152/565 |
| 3,687,719 | 8/1972 | Klötzer et al. | 524/493 |
| 3,738,948 | 6/1973 | Dunnom | 152/565 |
| 3,751,331 | 8/1973 | Dane et al. | 524/493 |
| 3,778,406 | 12/1973 | Klötzer et al. | 152/565 |
| 4,251,281 | 2/1981 | Machurat et al. | 524/493 |
| 4,299,640 | 11/1981 | Erickson | 152/565 |
| 4,390,648 | 6/1983 | Stacy | 524/570 |
| 4,585,826 | 4/1986 | Graves | 524/493 |
| 5,066,721 | 11/1991 | Hamada et al. | 525/102 |
| 5,089,554 | 2/1992 | Bomo et al. | 524/493 |
| 5,126,501 | 6/1992 | Ellul | 524/394 |
| 5,143,962 | 9/1992 | Wolff et al. | 524/493 |
| 5,227,425 | 7/1993 | Rauline | 524/493 |
| 5,244,028 | * 9/1993 | Segatta et al. | 524/493 |
| 5,342,598 | * 8/1994 | Persello | 423/339 |
| 5,394,919 | 3/1995 | Sandstrom et al. | 152/537 |
| 5,403,570 | 4/1995 | Chevallier et al. | 423/339 |
| 5,426,136 | * 6/1995 | Waddell et al. | 523/200 |
| 5,470,905 | 11/1995 | Meier et al. | 152/537 |
| 5,556,907 | 9/1996 | Fuchs et al. | 524/493 |
| 5,580,919 | 12/1996 | Agostini et al. | 524/493 |
| 5,604,286 | 2/1997 | Fuchs et al. | 524/493 |
| 5,665,812 | * 9/1997 | Gorce et al. | 524/495 |
| 5,871,597 | * 2/1999 | Vasseur | 524/493 |
| 5,929,156 | * 7/1999 | Fultz et al. | 524/493 |

FOREIGN PATENT DOCUMENTS

| | | | |
|---|---|---|---|
| 0501227 | 9/1992 | (EP) . | |
| 0520862 | 12/1992 | (EP) . | |
| 2467876 | 4/1981 | (FR) . | |
| 2060650 | 5/1981 | (GB) . | |
| 4931041 | 8/1974 | (JP) | 152/537 |

OTHER PUBLICATIONS

Database WPI Week 74, Derwent Publications Ltd. London, GB; Class 37, AN65587V & jP–B–49 031 041 (Tokyo Rubber IND CO LTD) Aug. 19, 1974.

* cited by examiner

Primary Examiner—Veronica P. Hoke
(74) Attorney, Agent, or Firm—BakerBotts, L.L.P.

(57) ABSTRACT

A radial carcass tire comprising a tread, two non-stretchable beads, two sidewalls connecting the beads to the tread, and a crown reinforcement located between the carcass and the tread, the crown reinforcement including a diene elastomeric rubber having, as reinforcing filler, a highly dispersible precipitated silica having a CTAB specific area less than or equal to 125 m$^2$/g and a BET specific surface area less than or equal to 125 m$^2$/g.

4 Claims, No Drawings

TIRE HAVING A BASE OF PRECIPITATED SILICA WITH IMPROVED ROLLING RESISTANCE

This is a divisional of co-pending application Ser. No. 08/587,067 now U.S. Pat. No. 5,871,597, issued Feb. 16, 1999, filed on Jan. 16, 1996, claiming priority of French patent application 95/00933, filed Jan. 20, 1995.

BACKGROUND OF THE INVENTION

The present invention relates to a radial carcass tire having a crown reinforcement of small hysteresis loss, with improved rolling resistance.

Since savings in fuel and the need to protect the environment have become a priority, it is desirable to employ rubber compositions which can be used for the manufacture of various semifinished products entering into the construction of tires, such as, for instance, cushion and calendering rubbers for cord fabric plies or treads in order to obtain tires having reduced resistance to rolling.

It is known to the person skilled in the art that the first and main factor affecting the resistance to rolling of a radial carcass tire resides in the rubber composition forming the tread of the tire.

Significant progress has been achieved in the field of tires having at the same time reduced resistance to rolling, excellent adherence both on dry and on snowy ground, very good resistance to wear, and reduced rolling noise, by the use, as tire tread, of a rubber composition, described in European Patent Application EP 0 501 227, which is vulcanizable by sulfur, obtained by the thermo-mechanical working of a conjugated diene polymer and an aromatic vinyl compound prepared by solution polymerization with 30 to 150 parts by weight of a highly dispersible precipitated silica to 100 parts by weight of elastomer.

It is also known to the person skilled in the art that the second factor which exerts a dominant influence with respect to the rolling resistance of a radial carcass tire is the crown reinforcement.

The crown reinforcement is generally formed of two plies of cord fabric having non-stretchable cords parallel to each other in one ply and crossed from one ply to the next, forming equal or different angles of between 10° and 45° with the circumferential direction. The cords are either metal cables, in particular of steel, or synthetic textile cords, in particular of aramids. These plies which are inclined with respect to the circumferential direction are referred to as "working" plies.

Particularly in the case of tires intended for high speed passenger vehicles the crown reinforcement can have, in addition to the working plies, one or more cord fabric plies, strips of cord fabric or of helically wound thread, the component cords or threads of which are substantially not inclined with respect to the circumferential direction, that is to say, they form an angle of zero degrees or close to zero degrees and are known as "zero-degree plies". The cord is generally a cord of synthetic textile, in particular a polyamide.

The calendering rubber used for the working plies is generally formed exclusively of natural rubber or by a blend of natural rubber and a diene synthetic rubber or a mixture of diene synthetic rubbers, natural rubber being present, however, in a preponderant amount by weight. This calendering rubber is ordinarily reinforced by carbon black as a major filler. However, it is known to the person skilled in the art, for instance from French patent application FR 80 22131 and U.S. Pat. No. 4,229,640, to use silica in a small amount, on the order of 10 to 15 parts by weight, in order to increase the adherence of the rubber to the metal cable and in particular to a brass-plated metal cable. However, the silica is used in combination with a reinforcing resin, generally one having a base of resorcinol, in order to increase the modulus of the calendering rubber, it being well-known to the person skilled in the art that the use of silica in tires as reinforcing filler has been retarded for a long time due, inter alia, to the lower modulus of elasticity of silica-filled rubber mixes.

The use of silica in tires also been extensively retarded due to difficulties in working resulting from silica-silica interactions which tend, in raw state, to cause an agglomerating of the silica particles before and even after mixing, making the working more difficult than with carbon black and leading to hard raw rubbers as soon as the percentage of silica used in the composition is relatively high. Due to their hardness, such rubbers are unsuitable as calendering rubbers for cord fabric and furthermore give rise to major problems of coherence in cured state. The use of such rubbers leads to a premature separation of the cords from the rubber, in particular at the ends of the working plies.

U.S. Pat. No. 5,066,721 describes a rubber composition having a base of a diene polymer functionalized by means of a special silane compound having a non-hydrolyzable aryloxy group capable of being used as calendering rubber for the cord fabric, in particular of crown reinforcement working plies and capable of containing up to 20 parts by weight of a conventional silica, that is to say a silica which has a high CTAB specific surface area of more than 100 $m^2/g$ and is only slightly dispersible. The improvement in the rolling resistance of the tire is essentially due to the nature of the functionalized diene polymer, which makes it possible to increase in a very small proportion the silica content of the calendering rubber, but also, at the same time, to increase the problem of internal coherence of the rubber and the risk of premature separation of the cord fabric from the rubber.

SUMMARY OF THE INVENTION

The object of the present invention is essentially to decrease the rolling resistance of a radial carcass tire without significantly impairing the other properties of the tire, such as adherence, resistance to wear, and resistance to fatigue, particularly of the crown reinforcement, and without resulting in a significant impairment with respect to the manufacture of the tire, particularly in the field of the raw working and cohesion in cured state of the rubber composition used for the production of the crown reinforcement of said tire.

The applicant has discovered that the purpose in view is achieved in accordance with the invention by the use of a silica having a low CTAB and BET specific surface area as reinforcing filler for diene elastomer compositions which can be used as crown reinforcement rubber of a radial carcass tire.

The object of the invention is a radial carcass tire having a tread, two non-stretchable beads, two sidewalls connecting the beads to the tread, and a crown reinforcement located between the carcass and the tread having at least two cord fabric plies, said crown reinforcement comprising a diene elastomeric rubber containing, as reinforcing filler, a silica mentioned above which has a CTAB specific surface area less than or equal to 125 $m^2/g$ and a BET specific surface area less than or equal to 125 $m^2/g$.

Another object of the invention is a diene elastomeric composition which can be used in the forming of a crown reinforcement of a radial carcass tire containing as reinforcing filler a silica having a CTAB specific surface area less than or equal to 125 m²/g and a BET specific surface area less than or equal to 125 m²/g.

The silica which can be used as reinforcing agent of the diene elastomeric rubber used in the overhead reinforcement is preferably a highly dispersible silica having a CTAB specific surface area of between 50 and 120 m²/g. When the specific surface area is less than 50 m²/g, the reinforcement is less and the cohesion reduced. When the CTAB specific surface area is more than 125 m²/g, rubber mixes of increased hardness are obtained which is detrimental for forming crown reinforcement calendering rubbers.

By highly dispersible silica there is understood any silica having the capability of disagglomeration and dispersion in a very large polymeric matrix, as can be observed by electronic or optical microscopy on fine sections. The dipersibility of the silica is also evaluated by means of an ultrasonic disagglomeration aptitude test (Fd) followed by a measurement, by diffraction on a granulometer, of the size of the silica particles in order to determine the median diameter (D50) of the particles after disagglomeration as described in European Patent Application EP 0 520 862, the content of which is incorporated herein, or as described in the article published in the magazine "Rubber World" of June 1994, pages 20 to 24, entitled "Dispersibility Measurement of Prec. Silicas".

More preferably, the highly dispersible silicas used in the present invention are all silicas which satisfy the characteristics of the CTAB and BET specific surface areas defined above, having a median diameter, after ultrasonic disagglomeration, of less than 5 μm and having an ultrasonic disagglomeration factor (Fd) of more than 2 ml and preferably more than 4 ml when the CTAB specific surface area is more than 100 m²/g. By way of example of such a silica, mention may be made of the silica Zeosil 85 MP of Rhône-Poulenc. The use of a highly dispersible silica reduces to a minimum fatigue failures of the elastomeric rubber and therefore the risks of separation of the rubber from the cords.

One can, of course, also use blends of different silicas of a CTAB specific surface area less than or equal to 125 m²/g. The CTAB specific surface area is determined by NFT method 45007 of November 1987. The BET specific surface area is determined by the method of Brunauer, Emmet, and Teller described in "The Journal of the American Chemical Society", Vol. 80, page 309 (1938), corresponding to NFT Standard 45007 of November 1987. The silicas used in accordance with the invention generally have a DOP oil absorption equal to or greater than 180 ml/100 g of silica and, more preferably, between 190 and 250 ml/100 g. The DOP oil absorption is determined in accordance with NFT Standard 30-022, using dioctylphtalate.

As diene elastomeric rubber which can be used as crown reinforcement rubber, that is to say, as cord fabric ply calendering rubber or as rubber cushion arranged above or below the working plies, natural rubber or a blend of natural rubber and a diene synthetic rubber or a mixture of diene synthetic rubbers are suitable. The natural rubber is preferably present in preponderant amount, representing more particularly between 75 and 100% by weight. The diene synthetic rubbers which can be used alone or in mixture with each other, in a blend with natural rubber, include any homopolymer obtained by polymerization of a conjugated diene monomer having 4 to 12 carbon atoms and any copolymer obtained by copolymerization of one or more conjugated dienes with each other or with one or more aromatic vinyl compounds having 8 to 20 carbon atoms are suitable. Suitable conjugated dienes include, in particular, butadiene-1,3, 2-methyl-1,3-butadiene, the 2,3-di($C_1$ to $C_5$ alcoyl)-1,3-butadienes, such as, for instance, 2,3-dimethyl-1,3-butadiene, 2,3-dimethyl-1,3-butadiene, 2-methyl-3-ethyl-1,3-butadiene, 2-methyl-3-isopropyl- 1,3-butadiene, phenyl- 1,3-butadiene, 1,3-pentadiene,2,4-hexadiene, etc.

Suitable aromatic vinyl compounds include, in particular, styrene, ortho- meta- and para-methylstyrenes, the commercial "vinyl toluene" mixture, para-tertiobutyl-styrene, the methoxy-styrenes, the chloro-styrenes, vinyl mesitylene, divinyl benzene, vinyl naphthalene, etc.

The copolymers may contain between 99% and 20% by weight of diene units and 1% to 80% by weight of aromatic vinyl units. The polymers may have any microstructure, which is a function of the conditions of polymerization used, in particular the presence or absence of a modifying or randomizing agent and the amounts of modifying and/or randomizing agent employed. The polymers may be block, statistical, sequenced, microsequenced polymers, etc. and can be prepared in dispersion or in solution, be coupled and/or starred or be functionalized.

By way of preference, polybutadienes are suitable, in particular the cis-1,4 or 1,2-syndiotactic polybutadienes and those having a content of 1,2 units of between 4% and 80%, the polyisoprenes, the butadiene-styrene copolymers and, in particular, those having a styrene content of between 5 and 50% by weight and more particularly between 20% and 40% by weight, a content of 1,2 bonds of the butadiene part of between 4% and 65%, a content of trans-1,4 bonds of between 30% and 80%, and butadiene-styrene-isoprene copolymers.

Preferably, a mixture of butadiene-styrene copolymer and polybutadiene is used, blended with the natural rubber in an amount up to 25% by weight.

The diene elastomeric rubber which can be used as overhead reinforcement rubber contains, to be sure, the other components and additives customarily employed in rubber mixes, such as plasticizers, pigments, antioxidants, sulfur, vulcanization accelerators, extender oils, one or more silica coupling agents and/or one or more silica covering agents such as polyols, amines, alkoxysilanes, etc., as well as agents for adherence of the rubber to the metal such as, for instance, the cobalt salts and complexes such as cobalt naphthenate, stearate or hydroxide, the compound Manobond 680 C sold by Manchem, etc., when the diene elastomeric rubber is used as calendering rubber of working plies having metal cables.

The beneficial effect with respect to the properties, in particular the rolling resistance, is also obtained when using both silica and carbon black as reinforcing filler of the crown reinforcement rubber.

The amount of carbon black can vary within wide limits, it being, however, understood that the improvement of the properties will be greater the larger the amount of silica present. The amount of carbon black present is preferably equal to or less than 100% of the amount of silica present in the composition, and more preferably it represents 1% to 50% by weight of the total reinforcing filler.

All the carbon blacks conventionally used in tires and in particular in the overhead reinforcement rubbers are suitable. One may also use a small proportion by weight of silica of a CTAB specific surface area of more than 125 m²/g and/or of a BET specific surface area of more than 125 m²/g which is highly dispersible or conventional.

The beneficial effect with respect to the decrease in hysteresis of the crown reinforcement rubber and therefore the decrease in the rolling resistance (see Tire Technology International, 1993, pages 58 to 62) is optimal when, in a tire without zero degree plies, the crown reinforcement rubber in accordance with the invention constitutes the calendering rubber for all of the working plies. The beneficial effect is, to be sure, less if only some of the working plies are calendered with this crown reinforcement rubber reinforced with the highly dispersible silica of low CTAB and BET specific surface areas. In the case of a tire having one or more zero degree plies, it is preferable that the calendering rubber of the cord fabric, whether present in the form of a ply of a certain width, that is to say close to the width of the working plies, or of strips or of sheathed unit thread also have such a calendering rubber. A beneficial effect, although smaller, is also obtained when the crown reinforcement is produced in conventional manner with a crown reinforcement rubber for the working plies and the zero degree ply or plies, if any, and when a cushion of diene elastomeric rubber reinforced with the highly dispersible silica of low specific surface area is arranged either below the working ply close to the carcass or above, along the crown reinforcement, the working ply or the zero degree ply close to the tread. This rubber cushion can also constitute the underlayer of the tread.

The crown reinforcement in accordance with the invention can be used in any radial carcass tire, whether the tread be reinforced with preponderant amount silica or not, or with carbon black exclusively. Of course, when the tire of the invention also has a tread reinforced with a preponderant amount of by highly dispersible silica of a CTAB specific surface area greater than 125 m²/g, as described in European Patent Application EP 0 501 227, the rolling resistance of the tire is least.

This beneficial effect with regard to the rolling resistance of the tire of the invention is obtained without significant impairment of the other properties of the tire and without significant impairment with regard to the working in raw state of the crown reinforcement rubber which remains substantially unchanged as compared with that of a conventional crown reinforcement rubber filled with a majority of carbon black and with respect to the cohesion in cured state of said rubber which retains good cohesion, particularly with respect to tearability and this even after aging.

In accordance with one variant, there can be associated with the silica filler a resin or a mixture of resins, and preferably a formyl phenol or formyl resorcinol resin in order to increase the modulus at small deformations while substantially retaining the other properties.

The invention is applicable to all types of radial carcass tires, that is to say passenger car tires, van tires, heavy-vehicle tires, and airplane tires.

The invention is illustrated, but not limited, by the examples, which do not constitute a limitation on the scope of the invention.

DESCRIPTION OF PREFERRED EMBODIMENTS

In the examples, the properties of the crown reinforcement rubber compositions are evaluated as follows:

Modules of elongation at 10% (ME 10), 100% (ME 100), and 300% (ME 300), measured in accordance with ISO Standard 471 in MPA Elongation upon rupture (ER) in % at 23° C. and at 100° C.

Hysteresis losses (HL): measured by rebound at 60° C. in accordance with ISO Standard R 17667 and expressed in %

The hysteresis is expressed by the measurement of tan δ at 80° C. at 10 Hertz in accordance with NFT Standard 46026.

Fatigue (MFTR): expressed in number of cycles, measured upon deformation imposed on a test piece subjected to an elongation of 90% until rupture of the test piece by means of an Monsanto MFTR apparatus in accordance with AFNOR Standard T46-021.

Fatigue (MFTRV): expressed in number of cycles, measured with deformation imposed on a test piece subjected to an elongation of 90% after aging for 10 days in a stove at 77 ° C., until rupture of the test piece.

Fatigue with notch (MFTRN) expressed in number of cycles: measured on a test piece containing a notch of 1 mm and subjected to an elongation of 60% by means of a Monsanto MFTR apparatus until rupture of the test piece in accordance with AFNOR Standard T46-021.

Mooney viscosity ML (1+4) at 100° C., measured in accordance with ASTM Standard D-1646

Heating (H): measured in degrees Celsius with a GOODRICH flexometer in accordance with ASTM Standard D-623-78

Dynamic properties as a function of the temperature: the hysteresis is expressed by the measurement of tan δ at 80° C. at 10 Hertz in accordance with NF Standard T 46-026.

The rolling resistance (RR) is measured in accordance with ISO Standard 8767 with a radial carcass tire.

In the examples, all parts are parts by weight.

EXAMPLE 1

Five tests were carried out permitting a comparison of the properties of the diene elastomeric compositions of the invention (tests D and E) with 3 reference compositions, as well as the rolling resistance properties of tires having a crown reinforcement based on said compositions.

The compositions are produced by thermo-mechanical working in a single step which lasts about 4 minutes with an average speed of the pallets of 45 rpm, until reaching a maximum temperature of decrease of 160° C. followed by a finishing step carried out at 30° C. with the formulations indicated in Table I.

TABLE I

| COMPOSITION | Test A | Test B | Test C | Test D | Test E |
|---|---|---|---|---|---|
| Natural rubber | 100 | 100 | 100 | 100 | 100 |
| Carbon black N326 | 52 | | | | |
| Silica ULTRASIL VN2 (a) | | 50 | | | |
| Silica ULTRASIL VN3* | | | 50 | | |
| Silica Zeosil 85MP (b) | | | | 57 | |
| Silica E (f) | | | | | 53 |
| Bonding agent (c) | | 2.5 | 2.5 | 2.5 | 2.5 |
| Zinc oxide | 7 | 7 | 7 | 7 | 7 |
| Stearic acid | 1 | 1 | 1 | 1 | 1 |
| Antioxidant (d) | 1.9 | 1.9 | 1.9 | 1.9 | 1.9 |
| Sulfur | 5 | 5 | 5 | 5 | 5 |
| Sulfenamide (e) | 1 | 1 | 1 | 1 | 1 |

(a)*Silicas of high specific surface area marketed by DEGUSSA under the names ULTRASIL VN2 and ULTRASIL VN3 having CTAB and BET specific surface areas of 128 m²/g and 132 m²/g respectively, a median diameter D50 of 11 μm, a disagglomeration factor (Fd) of 2 ml for the first and CTAB and BET specific surface areas of 169 m²/g and 180 m²/g, a median diameter (D50) of 9 μm and a disagglomeration factor (Fd) of 3 ml.

TABLE I-continued

| COMPOSITION | Test A | Test B | Test C | Test D | Test E |
|---|---|---|---|---|---|

(b)Silica marketed by Rhône-Poulenc under the name Zeosil 85MP having CTAB and BET specific surface areas of 60 m$^2$/g and 83 m$^2$/g, a median diameter D50 of 3 μm, and a disagglomeration factor (Fd) of 2.5 ml.
(c) Polysulfur organosilane marketed by DEGUSSA under the name SI 69.
(d) Antioxidant: N-(1,3-dimethyl-butyl)-N'-phenyl-p-phenylene diamine.
(e) Sulfenamide: tertio-butyl benzothiazole sulfenamide (TBBS)
(f)Precipitated silica in the form of microbeads having a CTAB specific surface area of 105 m$^2$/g, a BET specific surface area of 120 m$^2$/g, a median diameter (D50) of 4 μm, and disagglomeration factor (Fd) of 10 ml.

The vulcanization is effected at 150° C. for 40 minutes. The properties of these 5 compositions are compared with each other both in unvulcanized state and in vulcanized state. The rolling resistance of these compositions is also compared in conventionally manufactured radial carcass tires of size 175/70-13 MXT which are identical in all respects except for the constitution of the diene elastomeric composition serving as calendering rubber of the two metal working plies constituting the overhead reinforcement.

The results are set forth in Table II.

TABLE II

| Composition | A | B | C | D | E |
|---|---|---|---|---|---|
| Rubber property: Mooney | 75 | 90 | 95 | 74 | 78 |
| Properties in vulcanized state | | | | | |
| ME 10 | 6.82 | 6.6 | 10.8 | 6.7 | 6.7 |
| ME 100 | 6.0 | 4.2 | 6.2 | 6.0 | 5.1 |
| ME 300 | 12 | 7.4 | 10 | 11.6 | 10.6 |
| ER % 23° C. | 500 | 550 | 520 | 475 | 520 |
| MFTR·10$^3$ | 190 | 175 | 180 | 120 | 250 |
| MFTRV | 70 | 1500 | 1000 | 2000 | 1500 |
| MFTRN·10$^3$ | 33 | 25 | 30 | 53 | 35 |
| HL at 60° C.% | 20 | 25 | 27 | 14 | 20 |
| H° C. | 22 | 24 | 25 | 11 | 18 |
| Tan δ at 80° C. | 0.104 | 0.110 | 0.122 | 0.064 | 0.080 |
| RR | 100 | 101 | 102 | 95 | 98 |

It can be noted that the compositions used in accordance with the invention make it possible to retain a level of viscosity very close to that of the control mix having a base of carbon black (Test A) which is relatively small and which makes it possible to obtain a good calendering property, while compositions B and C lead to hard mixes which are not suitable for constituting crown reinforcement calendering rubbers.

It is also noted that compositions D and E in accordance with the invention have the smallest hysteresis, that is to say better hysteresis than the control composition A filled with carbon black which is customarily used as crown reinforcement calendering rubber, while retaining good adherence in cured state, and in particular good resistance to fatigue and to notch propagation. The hysteresis of compositions B and C is clearly higher not only than that exhibited by compositions D and E but also than that exhibited by composition A.

Tires having a crown reinforcement produced by composition D or E have a rolling resistance which is clearly improved without significantly impairing the fatigue resistance, that is to say the life of the tire.

EXAMPLE 2

The purpose of this example is to show that it is possible to increase the modulus at small deformations of the diene elastomeric rubber comprising the silica of low specific surface area as in the case of a reinforcement by means of carbon black while retaining a low hysteresis and good properties of cohesion in cured state, particularly after aging.

Three tests were carried out with the formulations indicated in Table III.

TABLE III

| Composition | Test F | Test G | Test H |
|---|---|---|---|
| Natural rubber | 100 | 100 | 100 |
| Carbon black N326 | 55 | | |
| Silica ULTRASIL VN2 (a) | | 47 | |
| Silica Zeosil 85MP (b) | | | 60 |
| Bonding agent (c) | | 2.5 | 2.5 |
| Antioxidant (d) | 1.9 | 1.9 | 1.9 |
| Formyl phenol resin | 0.7 | 3 | 3 |
| Zinc oxide | 7 | 7 | 7 |
| Stearic acid | 1 | 1 | 1 |
| Sulfur | 5 | 5 | 5 |
| Sulfenamide | 1 | 1 | 1 |
| Diphenyl guanidine | | 0.6 | 0.6 |
| Hexamethylene tetramine | 0.3 | 1 | 1 |

(a) (b) (c) (d): identical to those used in Example 1.

The results are set forth in Table IV.

TABLE IV

| Composition | Test F | Test G | Test H |
|---|---|---|---|
| Properties in vulcanized state | | | |
| ME 10 | 9.5 | 9.35 | 9.0 |
| ME 100 | 7.3 | 6.0 | 7.6 |
| ME 300 | 14.6 | 10.8 | 13 |
| ER 100° C.% | 420 | 440 | 410 |
| MFTR·10$^3$ | 145 | 123 | 136 |
| MFTRV | 9000 | 12000 | 16000 |
| MFTRN·10$^3$ | 21 | 20 | 61 |
| HL at 60° C.% | 23 | 22 | 17 |
| H° C. | 24.5 | 24 | 13 |

It can be noted that mixture H is particularly suitable for use as crown reinforcement elastomeric rubber, in particular as calendering rubber for working and/or overhead plies.

EXAMPLE 3

The purpose of this example is to show that the improved properties are also obtained when the reinforcing filler does not consist exclusively of silica of low specific surface area but, for instance, is a black/silica mixture;

In this example, the formulation used in Example 2 is employed, except with respect to the amounts of carbon black, Zeosil 85MP silica, bonding agent, diphenyl guanidine and formyl phenol resin.

Two tests were carried out, I and J, containing a 50%:50% silica/black filler and a 66%:34% silica/black filler. The results are set forth in Table V.

TABLE V

| Composition | Test F | Test I | Test J |
|---|---|---|---|
| Black N326 | 55 | 20 | 30 |
| Silica Zeosil 85 MP (b) |  | 40 | 30 |
| Bonding agent (c) |  | 2 | 1.5 |
| Diphenyl guanidine |  | 0.6 |  |
| Formyl phenol resin | 0.6 | 2 | 2 |
| Properties in vulcanized state |  |  |  |
| ME 10 | 9.5 | 9.25 | 8.95 |
| ME 100 | 7.3 | 7.9 | 6.84 |
| ME 300 | 14.6 | 14.4 | 12.8 |
| ER 100° C.% | 420 | 330 | 470 |
| HL at 60° C.% | 23 | 19 | 20.5 |
| H° C. | 24.5 | 17.5 | 20 |

(b) and (c): identical to those used in Example 1.

I claim:

1. A diene elastomeric composition for use in the manufacturing of a crown reinforcement of a radial carcass tire having reduced rolling resistance, said composition comprising a natural rubber, an unfunctionalized diene synthetic rubber, or a mixture thereof and a reinforcing filler comprising a silica of a CTAB specific surface area less than or equal to approximately 60 $m^2/g$ and a BET specific surface area less than or equal to approximately 83 $m^2/g$.

2. A composition according to claim 1 in which the silica has a median diameter (D50) after ultrasonic disagglomeration and a ultrasonic disagglomeration factor (Fd) in accordance with the relationships Fd>1.25 ml and D50<5 $\mu$m.

3. The composition according to claim 1 wherein the silica reinforcing filler has a CTAB specific surface area of approximately 60 $m^2/g$ and a BET specific surface area of approximately 83 $m^2/g$.

4. The composition according to claim 2 wherein the silica reinforcing filler has a CTAB specific surface area of approximately 60 $m^2/g$ and a BET specific surface area of approximately 83 $m^2/g$.

* * * * *

UNITED STATES PATENT AND TRADEMARK OFFICE
CERTIFICATE OF CORRECTION

PATENT NO. : 6,169,137 B1
DATED : January 2, 2001
INVENTOR(S) : Didier Vasseur

It is certified that error appears in the above-identified patent and that said Letters Patent is hereby corrected as shown below:

<u>Title page,</u>
Item [73], Assignee: "Generale" should read -- Générale --

<u>Column 10,</u>
Line 12, "a" should read -- an --

<u>Column 3,</u>
Line 18, "dipersibility" should read -- dispersibility --
Line 52, "dioctylphtalate" should read -- dioctylphthalate --

<u>Column 4,</u>
Line 4, "alcoyl)-" should read -- alkyl)- --
Line 6, "1,3-pentadiene,2,4-hexadiene," should read -- 1,3-pentadiene, 2,4-hexadiene, --

<u>Column 5,</u>
Line 62, "MPA" should read -- MPa --

<u>Column 8,</u>
Table III, "tetramine" should read -- tetraamine --

Signed and Sealed this

Eighth Day of October, 2002

Attest:

JAMES E. ROGAN
Attesting Officer
Director of the United States Patent and Trademark Office